US009979487B2

(12) United States Patent
Fu et al.

(10) Patent No.: US 9,979,487 B2
(45) Date of Patent: May 22, 2018

(54) METHOD FOR PROCESSING OPTICAL SIGNAL, OPTICAL SIGNAL SENDING NODE AND OPTICAL NODE

(71) Applicant: ZTE Corporation, Shenzhen, Guangdong Province (CN)

(72) Inventors: Xihua Fu, Shenzhen (CN); Xinling Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 241 days.

(21) Appl. No.: 14/904,400

(22) PCT Filed: Nov. 19, 2013

(86) PCT No.: PCT/CN2013/087429
§ 371 (c)(1),
(2) Date: Jan. 11, 2016

(87) PCT Pub. No.: WO2014/079349
PCT Pub. Date: May 30, 2014

(65) Prior Publication Data
US 2016/0156413 A1    Jun. 2, 2016

(30) Foreign Application Priority Data
Nov. 23, 2012 (CN) .......................... 2012 1 0483636

(51) Int. Cl.
*H04B 10/20* (2006.01)
*H04B 10/08* (2006.01)
(Continued)

(52) U.S. Cl.
CPC ............ *H04B 10/27* (2013.01); *H04J 14/026* (2013.01); *H04J 14/0227* (2013.01);
(Continued)

(58) Field of Classification Search
CPC .............................. H04J 14/0227; H04J 14/02
(Continued)

(56) References Cited

U.S. PATENT DOCUMENTS

| 7,950,017 B1* | 5/2011 | Cain | ...................... G06F 9/545 |
| | | | 719/310 |
| 2001/0053161 A1* | 12/2001 | Tomizawa | .............. H04J 3/047 |
| | | | 370/538 |

(Continued)

FOREIGN PATENT DOCUMENTS

| CN | 1452341 A | 10/2003 |
| CN | 101145881 A | 3/2008 |
| CN | 101686416 A | 3/2010 |

OTHER PUBLICATIONS

International Telecommunication Union, ITU-T G.872 Series G: Architecture of optical transport networks, Oct. 2012, All.*
(Continued)

*Primary Examiner* — David Payne
*Assistant Examiner* — Pranesh Barua
(74) *Attorney, Agent, or Firm* — Koppel, Patrick, Heybl & Philpott

(57) ABSTRACT

Provided are a method for processing an OS. The method includes: an OS sending node inserts OCh information into an overhead of an OMS of an OS; and/or, the OS sending node inserts the OCh information and optical carrier information into an OCh overhead of the OS, wherein the OCh information includes an identifier of the OCh, an NCF of an effective frequency slot of a media channel and a slot width of the effective frequency slot of the media channel, and a frequency slice granularity, and the optical carrier information includes: the number of optical carriers in the media channel, bit rates of the optical carriers in the media channel, modulation formats of the optical carriers in the media channel, NCFs of the optical carriers in the media channel, (Continued)

slot widths of the optical carriers in the media channel and a multiplexing method for the optical carriers.

12 Claims, 7 Drawing Sheets

(51) Int. Cl.
    *H04B 17/00*           (2015.01)
    *H04J 14/02*           (2006.01)
    *H04L 12/26*           (2006.01)
    *H04B 10/27*           (2013.01)

(52) U.S. Cl.
    CPC ...... *H04J 14/0256* (2013.01); *H04J 14/0257* (2013.01); *H04B 2210/072* (2013.01)

(58) Field of Classification Search
    USPC .......... 398/58, 34, 25, 96, 79; 370/216, 242, 370/248
    See application file for complete search history.

(56) References Cited

U.S. PATENT DOCUMENTS

| | | | |
|---|---|---|---|
| 2004/0190446 A1* | 9/2004 | Ansorge | H04J 3/08 370/228 |
| 2007/0147843 A1* | 6/2007 | Fujiwara | H04B 10/1143 398/118 |
| 2007/0237521 A1* | 10/2007 | Meyer | H04B 10/0791 398/19 |
| 2007/0292129 A1* | 12/2007 | Yan | H04B 10/032 398/5 |
| 2008/0131117 A1* | 6/2008 | Cho | H04J 3/1652 398/45 |
| 2008/0145056 A1* | 6/2008 | Boldi | H04J 14/0226 398/96 |
| 2012/0155856 A1* | 6/2012 | Ota | H04B 10/504 398/9 |
| 2012/0183291 A1* | 7/2012 | Tochio | H04J 3/1694 398/45 |
| 2013/0004164 A1* | 1/2013 | Toscano | H04J 3/14 398/34 |
| 2013/0028613 A1* | 1/2013 | Taki | H04J 3/1652 398/182 |
| 2013/0230316 A1* | 9/2013 | Hussain | H04J 14/0272 398/34 |
| 2013/0286847 A1* | 10/2013 | Schmidt | H04J 14/0258 370/241 |
| 2013/0343762 A1* | 12/2013 | Murayama | H04B 10/1141 398/130 |
| 2016/0006504 A1* | 1/2016 | Fu | H04B 10/077 398/24 |

OTHER PUBLICATIONS

International Search Report (Form PCT/ISA/210) for International Application No. PCT/CN2013/087429 dated Feb. 27, 2014.

* cited by examiner

METHOD FOR PROCESSING OPTICAL SIGNAL, OPTICAL SIGNAL SENDING NODE AND OPTICAL NODE

TECHNICAL FIELD

The disclosure relates to the field of communication, and in particular to a method for processing an Optical Signal (OS), an OS sending node and an optical node with a media channel matrix.

BACKGROUND

An optical transmission technology tends to develop towards single-channel with a higher rate (for example, single-channel with 400G/1T), higher spectral efficiency and high-order modulation format, and continuing increasing rate is thus still the most definite and important direction of development of optical transmission. There are many limits to high-speed transmission, mainly including two aspects: on one hand, the optical transmission technology develops towards high-spectral efficiency convergence transmission and high-speed service interface transmission, convergence of low speed to high speed for transmission is insignificant if spectral efficiency cannot be continuously improved, but it is also necessary to consider problems about transmission of a high-speed interface because there may be a high-speed Ethernet interface on a client side, and 400G may be a critical point of a spectral efficiency limit in the future; and on the other hand, the optical transmission technology develops towards long-distance (long-span and multi-span) transmission, and although a system OS to Noise Ratio (OSNR) may be increased by means of adopting a low-loss optical fibre, adopting a low-noise amplifier, reducing a span spacing and the like, achieved improvements are limited, and it is difficult to achieve a major breakthrough and implement a project.

Along with increase of bearer network bandwidth requirements, a beyond-100G technology becomes a solution to increasing bandwidth requirements, and for no matter 400G or 1T beyond 100G, it is impossible for traditional 50 GHz fixed grid Wavelength Division Multiplexing (WDM) to provide a sufficient spectral width for implementation of the beyond-100G technology. Because of defects of a fixed grid, a requirement on a wider flexible grid is made.

In the related technology, beyond-100G multi-rate mixed transmission and beyond-100G modulation format flexibility cause different channel bandwidth requirements, and if each channel is customized with a proper bandwidth, a system bandwidth may be fully utilized, thereby generating a flexible grid system. A requirement on an ultrahigh-speed WDM system continuously increases on the basis of a bandwidth requirement, so that a requirement on a flexible grid technology is introduced. However, many problems such as how to effectively implement frequency spectrum planning and management and achieve compatibility with an existing system are to be solved.

For the problem of how to effectively implement frequency spectrum planning and management, for example, how to break a limit to a selected fixed rate under a beyond-100G condition, after introduction of a flexible grid technology in the related technology, there is yet no effective solution.

SUMMARY

The embodiment of the disclosure provides a method for processing an OS, an OS sending node and an optical node with a media channel matrix, so as to solve the problem of how to effectively implement frequency spectrum planning and management after introduction of a flexible grid technology in the related art.

According to one aspect of the embodiment of the disclosure, a method for processing an OS is provided, which includes: an OS sending node inserts Optical Channel (OCh) information into an Optical Multiplex Section (OMS) overhead of the OS; and/or, the OS sending node inserts the OCh information and optical carrier information into an OCh overhead of the OS, wherein the OCh information includes an identifier of the OCh, a Nominal Central Frequency (NCF) of an effective frequency slot of a media channel and a slot width of the effective frequency slot of the media channel, and a frequency slice granularity, and the optical carrier information includes: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers.

Preferably, when an OCh payload is supported by multiple media channels, the OCh information inserted into the overhead of the OCh by the OS sending node includes the identifier of the OCh, an NCF of an effective frequency slot of each media channel supporting the OCh payload, slot widths of the effective frequency slots of all the media channels supporting the OCh payload and a frequency slice granularity.

Preferably, when different optical carriers in the media channel adopt different modulation formats and different bit rates, the optical carrier information includes: the bit rate of each optical carrier in the media channel, a modulation format of each optical carrier in the media channel, an NCF of each optical carrier in the media channel and a slot width of each optical carrier in the media channel, and the multiplexing method for the optical carriers.

Preferably, after the OS sending node inserts the OCh information into the OMS overhead of the OS, the method further includes: an intermediate optical node with a media channel matrix receives the OS from the sending node; the intermediate optical node compares the OCh information acquired from the OMS overhead of the OS with expected OCh information received from a local management plane or control plane; and if the acquired OCh information is the same as the expected OCh information, the intermediate optical node demultiplexes the media channel corresponding to the OCh from the OS according to the acquired OCh information, otherwise the intermediate optical node prompts an alarm about a configuration error of the OMS of the OS.

Preferably, before the intermediate optical node receives the OS from the sending node, the method further includes: the management plane or the control plane directly transmits the expected OCh information to the intermediate optical node.

Preferably, after the OS sending node inserts the OCh information and the optical carrier information into the overhead of the OCh of the OS, the method further includes: the intermediate optical node with the media channel matrix acquires the OCh information and the optical carrier information from the overhead of the OCh of the OS; the intermediate optical node compares the acquired OCh information and optical carrier information with expected OCh information and expected optical carrier information received from the local management plane or control plane; and if the acquired OCh information and optical carrier information are the same as the expected OCh information and the expected optical carrier information, the intermediate optical node switches the demultiplexed media channel to another optical fibre connected with the optical node according to frequency spectrum cross connection information for configuration of media channels in the local management plane or control plane, otherwise the intermediate optical node prompts an alarm about a configuration error of the OCh of the OS.

Preferably, before the intermediate optical node receives the OS from the sending node, the method further includes: the management plane or the control plane directly transmits the expected OCh information and the expected optical carrier information to the intermediate optical node.

Preferably, after the OS sending node inserts the OCh information and the optical carrier information into the overhead of the OCh of the OS, the method further includes: when a destination node of a service born by the OS receives the OS, the destination node acquires the OCh information and the optical carrier information from the overhead of the OCh of the OS, and demodulates the OS according to the acquired OCh information and optical carrier information.

According to another aspect of the embodiment of the disclosure, an OS sending node is provided, which includes: an insertion component configured to insert OCh information into an OMS overhead of an OS to be sent, and/or, configured to insert the OCh information and optical carrier information into an OCh overhead of the OS, wherein the OCh information includes an identifier of the OCh, an NCF of an effective frequency slot of a media channel and a slot width of the effective frequency slot of the media channel, and a frequency slice granularity, and the optical carrier information includes: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers.

According to another aspect of the embodiment of the disclosure, an optical node with a media channel matrix is provided, which includes: a receiving component configured to receive an OS which bears service data from an upstream node; a comparing component configured to compare OCh information acquired from an OMS overhead of the OS with expected OCh information received from a local management plane or control plane, wherein the OCh information includes an identifier of an OCh, an NCF of an effective frequency slot of a media channel, a slot width of the effective frequency slot of the media channel and a frequency slice granularity; and an OMS processing component configured to, under the condition that the acquired OCh information is the same as the expected OCh information, demultiplex the media channel corresponding to the OCh from the OS according to the acquired OCh information, and under the condition that the acquired OCh information is different from the expected OCh information, prompt an alarm about a configuration error of the OMS of the OS.

According to another aspect of the embodiment of the disclosure, another optical node with a media channel matrix is provided, which includes: an acquiring component, configured to acquire OCh information and optical carrier information from an OCh overhead of an received OS, wherein the OCh information includes an identifier of the OCh, an NCF of an effective frequency slot of a media channel, a slot width of the effective frequency slot of the media channel and a frequency slice granularity, and the optical carrier information includes: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers; a judgment component configured to compare the acquired OCh information and optical carrier information with expected OCh information and expected optical carrier information received from a local management plane or control plane; and an OCh processing component configured to, under the condition that the acquired OCh information and optical carrier information are the same as the expected OCh information and the expected optical carrier information respectively, switch the demultiplexed media channel to another optical fibre connected with the optical node according to frequency spectrum cross connection information for configuration of media channels in the local management plane or control plane, and under the condition that the acquired OCh information and optical carrier information are different from the expected OCh information and the expected optical carrier information, prompt an alarm about a configuration error of the OCh of the OS.

Preferably, the optical node with the media channel matrix further includes: a demodulation component configured to demodulate the OS according to the OCh information and optical carrier information acquired from the overhead of the OCh by the acquiring component.

By the embodiment of the disclosure, the OS sending node inserts new OCh information into the OMS overhead of the OS, and/or, the OS sending node inserts the new OCh information and new optical carrier information into the overhead of the OCh of the OS, so that the problem of how to effectively implement frequency spectrum planning and management after the introduction of the flexible grid technology in the related technology is solved, and processing efficiency and accuracy of a system are improved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to form improper limits to the disclosure. In the drawings.

DETAILED DESCRIPTION OF THE EMBODIMENTS

The disclosure is described below with reference to the drawings and embodiments in detail. It is important to note that the embodiments in the disclosure and characteristics in the embodiments can be combined under the condition of no conflicts.

The embodiment of the disclosure provides a method for processing an OS, which includes the following manners:

Manner 1: an OS sending node inserts OCh information into an OMS overhead of an OS;

Manner 2: the OS sending node inserts the OCh information and optical carrier information into an OCh overhead of the OS; and Manner 3: the OS sending node inserts the OCh information into the OMS overhead of the OS, and inserts the OCh information and the optical carrier information into the overhead of the OCh of the OS.

Figure 1:
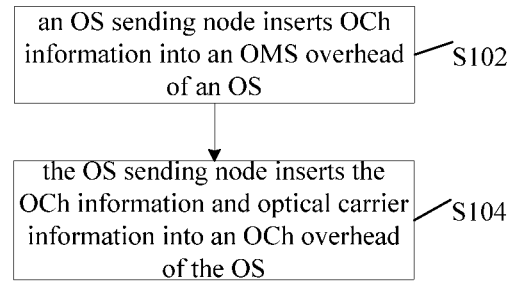
FIG. 1 is a flowchart of a method for processing an OS according to an embodiment of the disclosure.

Manner 3 covers Manner 1 and Manner 2, and the method for processing the OS provided by the embodiment of the disclosure is described below with Manner 3 as an example. FIG. 1 is a flowchart of a method for processing an OS according to an embodiment of the disclosure, and as shown in FIG. 1, the method includes the following blocks.

In block 102: an OS sending node inserts OCh information into an OMS overhead of an OS; and In block 104: the OS sending node inserts the OCh information and optical carrier information into an OCh overhead of the OS, wherein the OCh information includes an identifier of the OCh, an NCF of an effective frequency slot of a media channel, a slot width of the effective frequency slot of the media channel and a frequency slice granularity, and the optical carrier information includes: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers.

By the above blocks, the OS sending node inserts new OCh information into the OMS overhead of the OS, and/or, the OS sending node inserts the new OCh information and new optical carrier information into the overhead of the OCh of the OS, so that the problem of how to effectively implement frequency spectrum planning and management after introduction of a flexible grid technology in the related art is solved, and processing efficiency and accuracy of a system are improved.

When an OCh payload is supported by multiple media channels, the OCh information inserted into the overhead of the OCh by the OS sending node in block 104 may include the identifier of the OCh, an NCF of an effective frequency slot of each media channel supporting the OCh payload and slot widths of the effective frequency slots of all the media channels supporting the OCh payload and frequency slice granularities.

When different optical carriers in the media channel adopt different modulation formats and different bit rates, the optical carrier information may include: the bit rate of each optical carrier in the media channel, a modulation format of each optical carrier in the media channel, an NCF of each optical carrier in the media channel, a slot width of each optical carrier in the media channel and the multiplexing method for the optical carriers.

After block 102, an intermediate optical node with a media channel matrix receives the OS from the sending node; the intermediate optical node compares the OCh information acquired from the OMS overhead of the OS with expected OCh information received from a local management plane or control plane; and if the acquired OCh information is the same as the expected OCh information, the intermediate optical node demultiplexes the media channel corresponding to the OCh from the OS according to the acquired OCh information, otherwise the intermediate optical node prompts an alarm about a configuration error of the OMS of the OS. Before block 102, the management plane or the control plane may directly issue the expected OCh information to the intermediate optical node.

Preferably, after block 104, the intermediate optical node with the media channel matrix acquires the OCh information and the optical carrier information from the overhead of the OCh of the OS; the intermediate optical node compares the acquired OCh information and optical carrier information with expected OCh information and expected optical carrier information received from the local management plane or control plane; and if the acquired OCh information and optical carrier information are the same as the expected OCh information and the expected optical carrier information respectively, the intermediate optical node switches the demultiplexed media channel to another optical fibre connected with the optical node according to frequency spectrum cross connection information for configuration of media channels in the local management plane or control plane, otherwise the intermediate optical node prompts an alarm about a configuration error of the OCh of the OS. Before block 104, the management plane or the control plane may directly issue the expected OCh information and optical carrier information to the intermediate optical node.

After block 104, when a destination node of a service born by the OS receives the OS, the destination node may acquire the OCh information and the optical carrier information from the overhead of the OCh of the OS, and demodulates the OS according to the acquired OCh information and optical carrier information.

Figure 2:
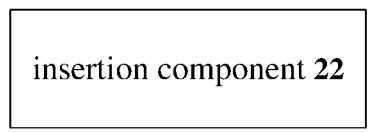
FIG. 2 is a structure diagram of an OS sending node according to an embodiment of the disclosure.

Corresponding to the method, one embodiment of the disclosure further provides an OS sending node. FIG. 2 is a structure diagram of an OS sending node according to an embodiment of the disclosure, and as shown in FIG. 2, the sending node includes: an insertion component 22, configured to insert OCh information into an OMS overhead of an OS to be sent, and/or, configured to insert the OCh information and optical carrier information into an OCh overhead of the OS, wherein the OCh information includes an identifier of the OCh, an NCF of an effective frequency slot of a media channel, a slot width of the effective frequency slot of the media channel and a frequency slice granularity, and the optical carrier information includes: the number of optical carriers in the media channel, a bit rate of each optical carrier in the media channel, a modulation format of the each optical carrier in the media channel, an NCF of the each optical carrier in the media channel and a slot width of the each optical carrier in the media channel, and a multiplexing method for the optical carriers.

By the sending node, the insertion component 22 is configured to insert the OCh information into the OMS overhead of the OS to be sent, and/or, insert the OCh information and the optical carrier information into the overhead of the OCh of the OS, so that the problem of how to effectively implement frequency spectrum planning and management after the introduction of the flexible grid technology in the related art is solved, and the processing efficiency and accuracy of the system are improved.

Figure 3:
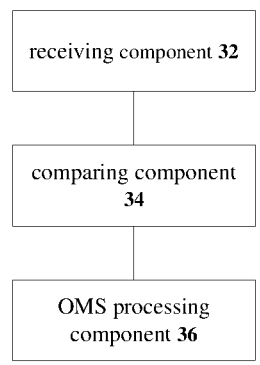
FIG. 3 is a structure diagram of an optical node with a media channel matrix according to an embodiment of the disclosure.

Corresponding to the method, one embodiment of the disclosure further provides an optical node with a media channel matrix. FIG. 3 is a structure diagram of an optical node with a media channel matrix according to an embodiment of the disclosure, and as shown in FIG. 3, the optical node includes: a receiving component 32, a comparing component 34 and an OMS processing component 36, wherein the receiving component 32 is configured to receive an OS which bears service data from an upstream node; the comparing component 34 is coupled to the receiving component 32, and is configured to compare OCh information acquired from an OMS overhead of the OS with expected OCh information received from a local management plane or control plane, the OCh information including an identifier of an OCh, an NCF of an effective frequency slot of a media channel, a slot width of the effective frequency slot of the media channel and a frequency slice granularity; and the OMS processing component 36 is coupled to the comparing component 34, and is configured to, under the condition that a comparing result of the comparing component 34 indicates that the acquired OCh information is the same as the expected OCh information, demultiplex the media channel corresponding to the OCh from the OS according to the acquired OCh information, and under the condition that the comparing result of the comparing component 34 indicates that the acquired OCh information is different from the expected OCh information, prompt an alarm about a configuration error of the OMS of the OS.

By the optical node with the media channel matrix, the receiving component 32 receives the OS which bears the service data from the upstream node; the comparing component 34 compares the OCh information acquired from the OMS overhead of the OS with the expected OCh information received from the local management plane or control plane; and the OMS processing component 36 demultiplexes the media channel corresponding to the OCh from the OS according to the acquired OCh information under the condition that the comparing result of the comparing component 34 indicates that the acquired OCh information is the same as the expected OCh information, and the OMS processing component 36 prompts the alarm about the configuration error of the OMS of the OS under the condition that the comparing result of the comparing component 34 indicates that the acquired OCh information is different from the expected OCh information. The problem of how to effectively implement frequency spectrum planning and management after the introduction of the flexible grid technology in the related art is solved, and the processing efficiency and accuracy of the system are improved.

Figure 4:
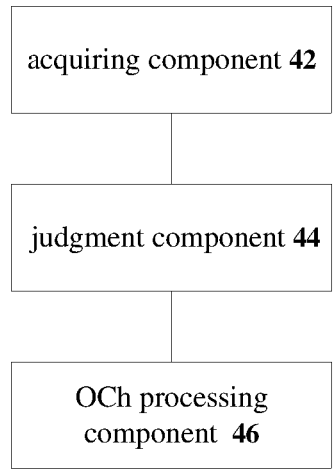
FIG. 4 is a structure diagram of an optical node with a media channel matrix according to another embodiment of the disclosure.

Corresponding to the method, the embodiment of the disclosure further provides an optical node with a media channel matrix. FIG. 4 is a structure diagram of an optical node with a media channel matrix according to another embodiment of the disclosure, and as shown in FIG. 4, the optical node includes: an acquiring component 42, a judgment component 44 and an OCh processing component 46, wherein the acquiring component 42 is configured to acquire OCh information and optical carrier information from an OCh overhead of an received OS, the OCh information including an identifier of the OCh, an NCF of an effective frequency slot of a media channel, a slot width of the effective frequency slot of the media channel and a frequency slice granularity, and the optical carrier information including: the number of optical carriers in the media channel, a bit rate of each optical carriers in the media channel, a modulation format of the each optical carrier in the media channel, an NCF of the each optical carrier in the media channel, a slot width of the each optical carrier in the media channel and a multiplexing method for the optical carriers; the judgment component 44 is coupled to the acquiring component 42, and is configured to compare the acquired OCh information and optical carrier information with expected OCh information and expected optical carrier information received from a local management plane or control plane; and the OCh processing component 46 is coupled to the judgment component 44, and is configured to, under the condition that a judgment result of the judgment component 44 indicates that the acquired OCh information and optical carrier information are the same as the expected OCh information and the expected optical carrier information respectively, switch the demultiplexed media channel to another optical fibre connected with the optical node according to frequency spectrum cross connection information for configuration of media channels in the local management plane or control plane, and under the condition that the judgment result of the judgment component 44 indicates that the acquired OCh information and optical carrier information are different from the expected OCh information and the expected optical carrier information, prompt an alarm about a configuration error of the OCh of the OS.

By the optical node with the media channel matrix, the acquiring component 42 is configured to acquire the OCh information and the optical carrier information from the overhead of the OCh of the received OS; the judgment component 44 compares the acquired OCh information and optical carrier information with the expected OCh information and expected optical carrier information received from the local management plane or control plane; and the OCh processing component 46 switches the demultiplexed media channel to another optical fibre connected with the optical node according to the frequency spectrum cross connection information for the configuration of the media channels in the local management plane or control plane under the condition that the judgment result of the judgment component 44 indicates that the acquired OCh information and optical carrier information are the same as the expected OCh information and the expected optical carrier information respectively, and prompts the alarm about the configuration error of the OCh of the OS under the condition that the judgment result of the judgment component 44 indicates that the acquired OCh information and optical carrier information are different from the expected OCh information and the expected optical carrier information. The problem of how to effectively implement frequency spectrum planning and management after the introduction of the flexible grid technology in the related art is solved, and the processing efficiency and accuracy of the system are improved.

Figure 5:
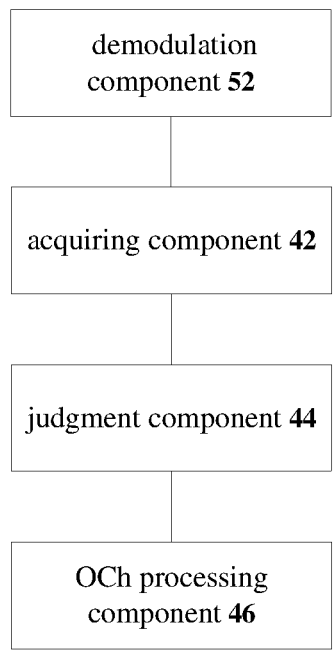
FIG. 5 is a structure diagram of an optical node with a media channel matrix according to another preferred embodiment of the disclosure.

FIG. 5 is a structure diagram of an optical node with a media channel matrix according to another preferred embodiment of the disclosure, and as shown in FIG. 5, except all the components of the optical node shown in FIG. 4, the optical node further includes: a demodulation component 52, coupled to the acquiring component 42 and configured to demodulate the OS according to the OCh information and optical carrier information acquired from the overhead of the OCh by the acquiring component 42.

An implementation process of the embodiment is described below with reference to preferred embodiments and the drawings in detail.

Embodiment 1

One embodiment provides a data management solution for an optical transmission network, so as to at least solve the problem of how to effectively implement frequency spectrum planning and management after introduction of a flexible grid technology in the related art.

Figure 6:
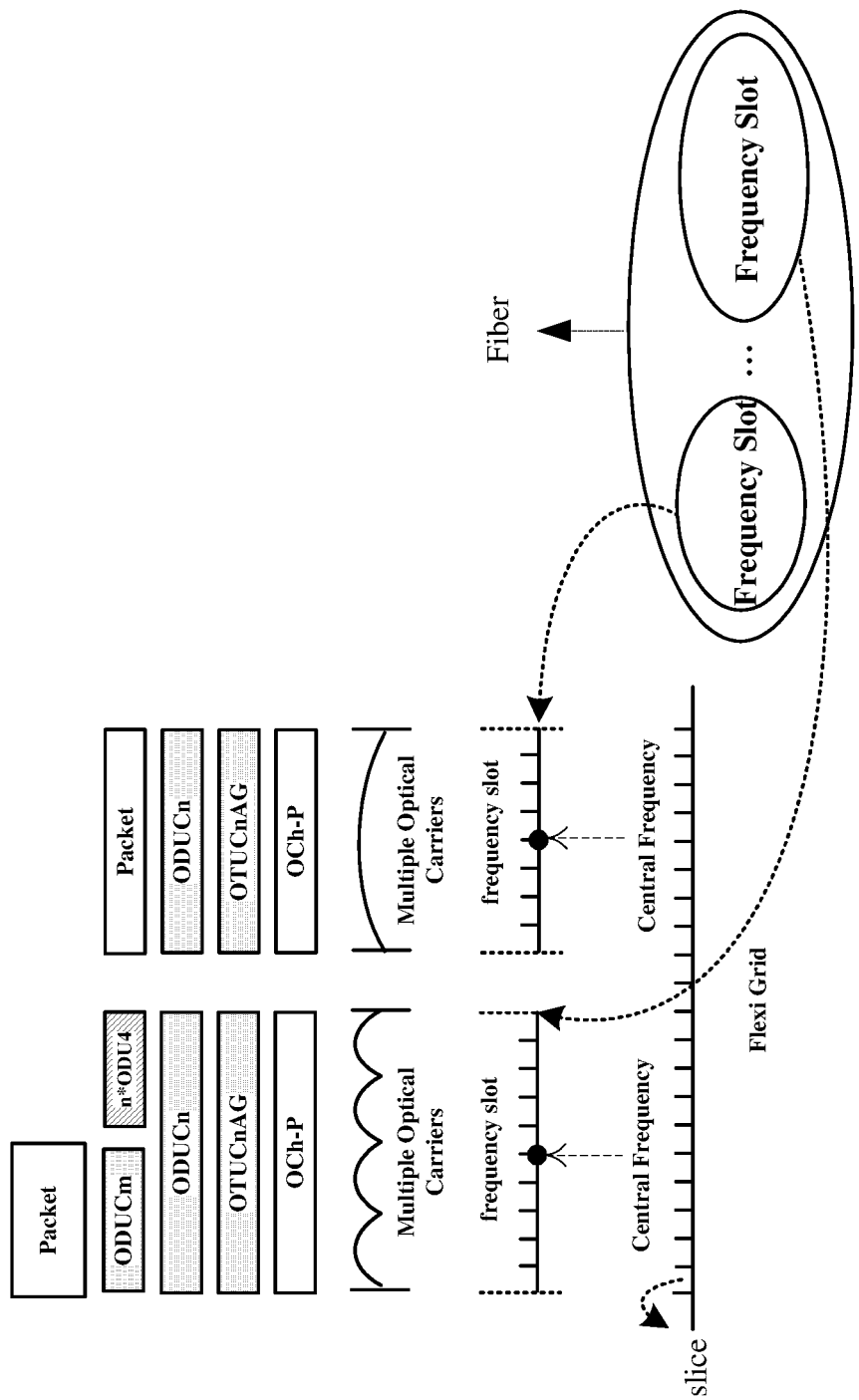
FIG. 6 is a diagram of a mapping and multiplexing processing flow of ODUCn-OTUCnAG-OChAG according to embodiment 1 of the disclosure.

FIG. 6 is a diagram of a mapping and multiplexing processing flow of ODUCn-OTUCnAG-OChAG according to embodiment 1 of the disclosure. As shown in FIG. 6, packet service data is mapped to a super optical data unit (ODUCn, representing an ODU with a rate higher than ODUk (k=0,1,2,2e,3,4)), and ODUCn is mapped to a super Optical Transmission Unit High-speed Administrative Group (OTUCnAG) for short); and OTUCnAG is mapped to a super OCh (OChAG), wherein rates of ODUCn, OTUCnAG and OChAG are N times of 100 Gbit/s (Gb/s), a size of a branch time sequence of ODUCn is 100 Gb/s, and N is a positive integer of more than or equal to 2.

It is important to note that OTUCnAG is an OTU high-speed administrative group, is an N*100 Gb/s composite signal, and consists of N 100G OTU frames, for example, OTUC2AG is a 200 Gb/s, and OTUC4AG represents 400 Gb/s; OChAG represents an OCh signal set used for bearing OTUCnAG, and if OSs pass through the same router, OChAG provides a single entity for manage these signals; and if the signals pass through different routers, multiple OChs are required, and the signals passing through the same router are managed by the same OCh.

ODU4 which bears low-order optical data unit (ODUk) or packet service data and low-order ODUCm (m is less than n) which bears the packet service data are jointly multiplexed into high-order ODUCn, wherein ODUk includes at least one of: ODU0, ODU1, ODU2, ODU2e, ODU3 and ODUflex; and high-order ODUCn is mapped to OTUCnAG.

Figure 7:
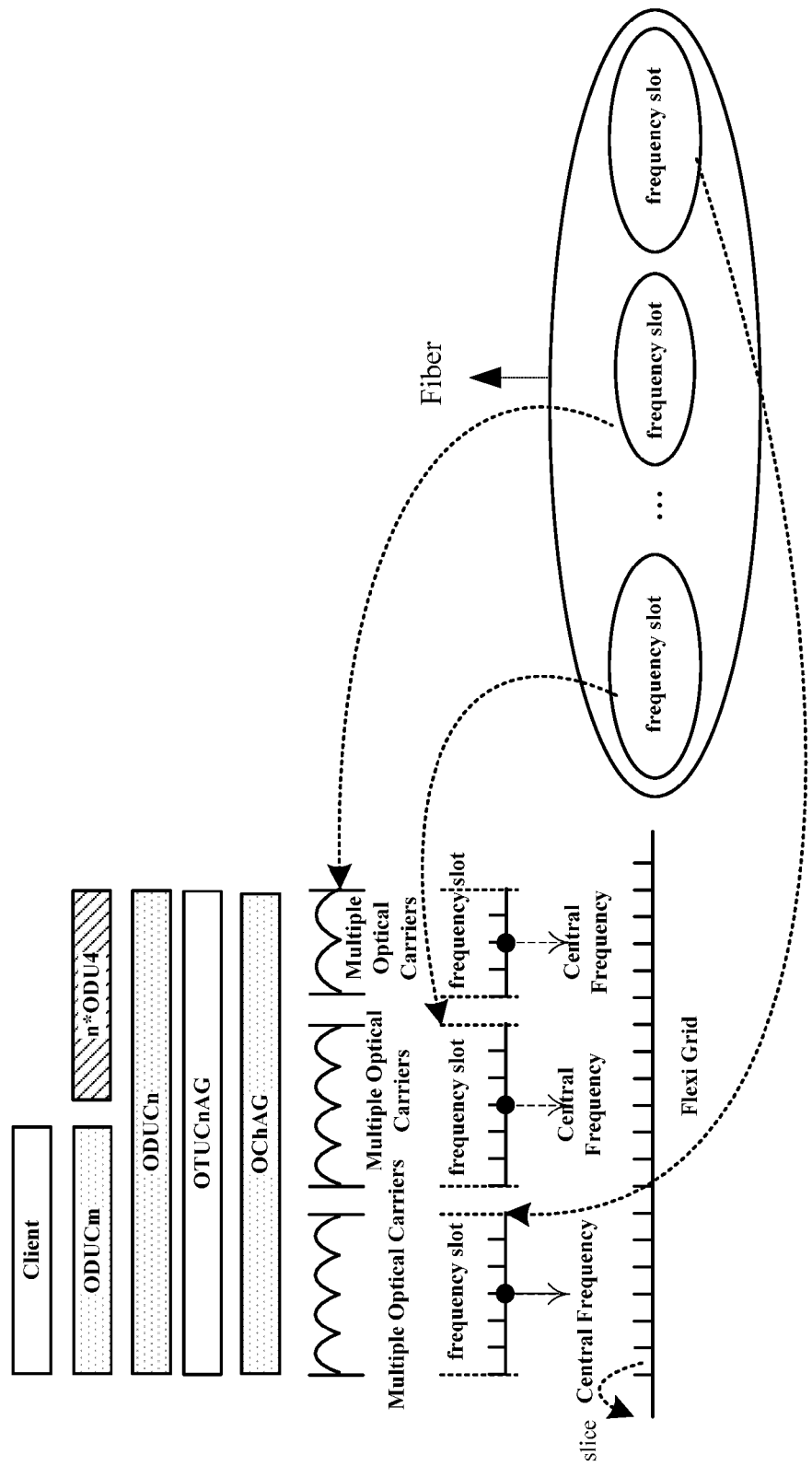
FIG. 7 is a diagram of a mapping and multiplexing processing flow of another ODUCn-OTUCnAG-OChAG according to embodiment 1 of the disclosure.

FIG. 7 is a diagram of a mapping and multiplexing processing flow of another ODUCn-OTUCnAG-OChAG according to embodiment 1 of the disclosure, wherein multiple OSs included in an OCh Administrative Group (OChAG) are born by discrete frequency spectrums, and pass through the same router. As shown in FIG. 7, ODUCn is mapped to OTUCnAG, the OSs passing through a single OChAG in the OTUCnAG pass through the same router, and occupy the discrete frequency spectrums. These signals are managed by a single OChAG entity.

Figure 8:
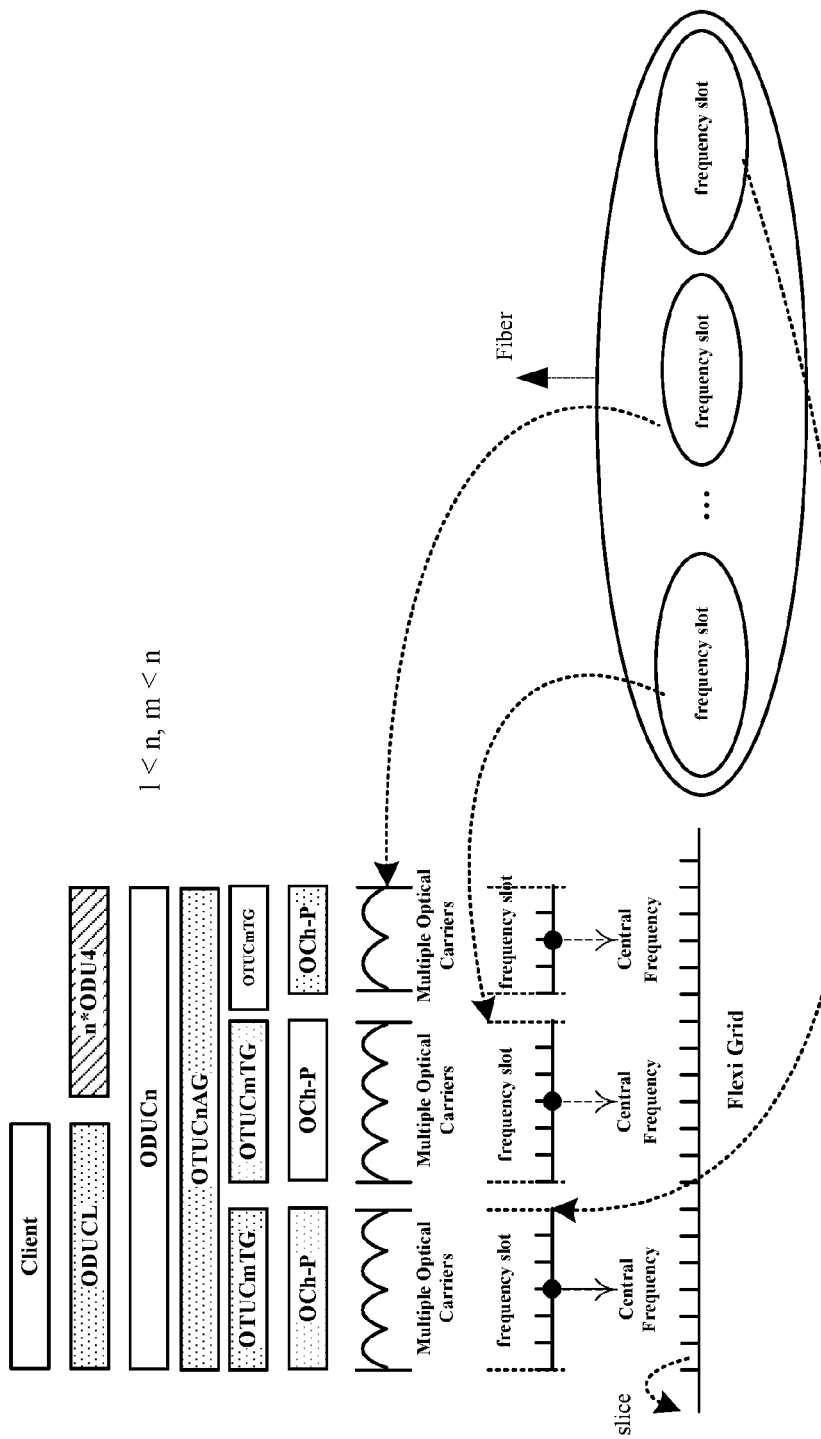
FIG. 8 is a diagram of a mapping and multiplexing processing flow of ODUCn-OTUCnAG-z*OTUCmTG-OChAG according to embodiment 1 of the disclosure.

FIG. 8 is a diagram of a mapping and multiplexing processing flow of ODUCn-OTUCnAG-z*OTUCmTG-OChAG according to embodiment 1 of the disclosure, wherein multiple OSs included in an OChAG are born by discrete frequency spectrums, and pass through different routers. As shown in FIG. 8, mapping ODUCn to OTUCnAG and then mapping OTUCnAG into OChAG includes: reversely multiplexing OTUCnAG into multiple super OTUs (OTUCmTG), and then mapping OTUCmTG to corresponding OChs, wherein a rate of OTUCmTG is M times of 100 Gb/s, M is more than or equal to 1, and M is less than N. OTUCmTG (m is less than n) is an m*100 Gb/s composite signal. Each OTUCmTG has the same rate level, or, all ODUSi have different rate levels.

The embodiment provides a data management method for an optical transmission network. An identifier of an OCh, an NCF and slot width of an effective frequency slot of a media channel and a frequency slice granularity are included in an OMS overhead.

When an OCh payload is supported by multiple media channels, the OMS overhead includes the identifier of the OCh, NCFs and slot widths of effective frequency slots of all the media channels supporting the OCh payload, and frequency slice granularities.

A node demultiplexes the media channel corresponding to the OCh from an OS according to the identifier of the OCh, NCFs and slot widths of effective frequency slots of the media channels, and frequency slice granularities which are in the OMS.

In an implementation process, the data management method for the optical transmission network in the embodiment further includes: first a management plane or a control plane configures an expected identifier of the OCh, expected NCFs and slot widths of the effective frequency slots of all the media channels supporting the OCh payload and expected frequency slice granularities to the node receiving the OS; then the node receives the identifier of the OCh, the NCF and slot width of the effective frequency slot of the media channel and the frequency slice granularity from the OMS overhead; and finally the node compares the configured expected overhead with received overhead information, and generates a mismatch alarm if the expected overhead information is different from the received overhead information.

The embodiment further provides a data management method for an optical transmission network, which includes: a node inserts an identifier of an OCh, an NCF and slot width of an effective frequency slot of a media channel, the number of optical carriers in the media channel, a bit rate and modulation format of each optical carrier and a multiplexing method for the optical carriers into an overhead of the OCh.

When the optical carriers in the media channel may adopt different modulation formats and bit rates, the overhead of the OCh includes the identifier of the OCh, the NCF and slot width of the effective frequency slot of the media channel, and bit rate, modulation format, NCF and slot width information of each optical carrier in the media channel and the multiplexing method for the optical carriers.

The node demodulates an OS according to the information which is carried in the overhead of the OCh and comprises the identifier of the OCh, NCF and slot width of the effective frequency slot of the optical channel, the number of the optical carriers, the bit rate, modulation format, NCF and slot width information of each optical carrier in the media channel and multiplexing method for the optical carriers.

In an implementation process, the data management method for the optical transmission network in the embodiment further includes: first a management plane or a control plane configures an expected identifier of the OCh, an expected NCF and slot width of the effective frequency slot of the media channel, expected number of the optical carriers in the media channel, the expected bit rate, modulation format, NCF and slot width information of the optical carriers and an expected multiplexing method for the optical carriers to the node receiving the OS; then the node receives the identifier of the OCh, the NCF and slot width of the effective frequency slot of the media channel, the number of the optical carriers in the media channel, the bit rate, modulation format, NCF and slot width information of the optical carriers and the multiplexing method for the optical carriers from the overhead of the OCh; and finally the node compares the configured overhead information with received overhead information, and generates a mismatch alarm if the information is different.

Embodiment 2

Figure 9:
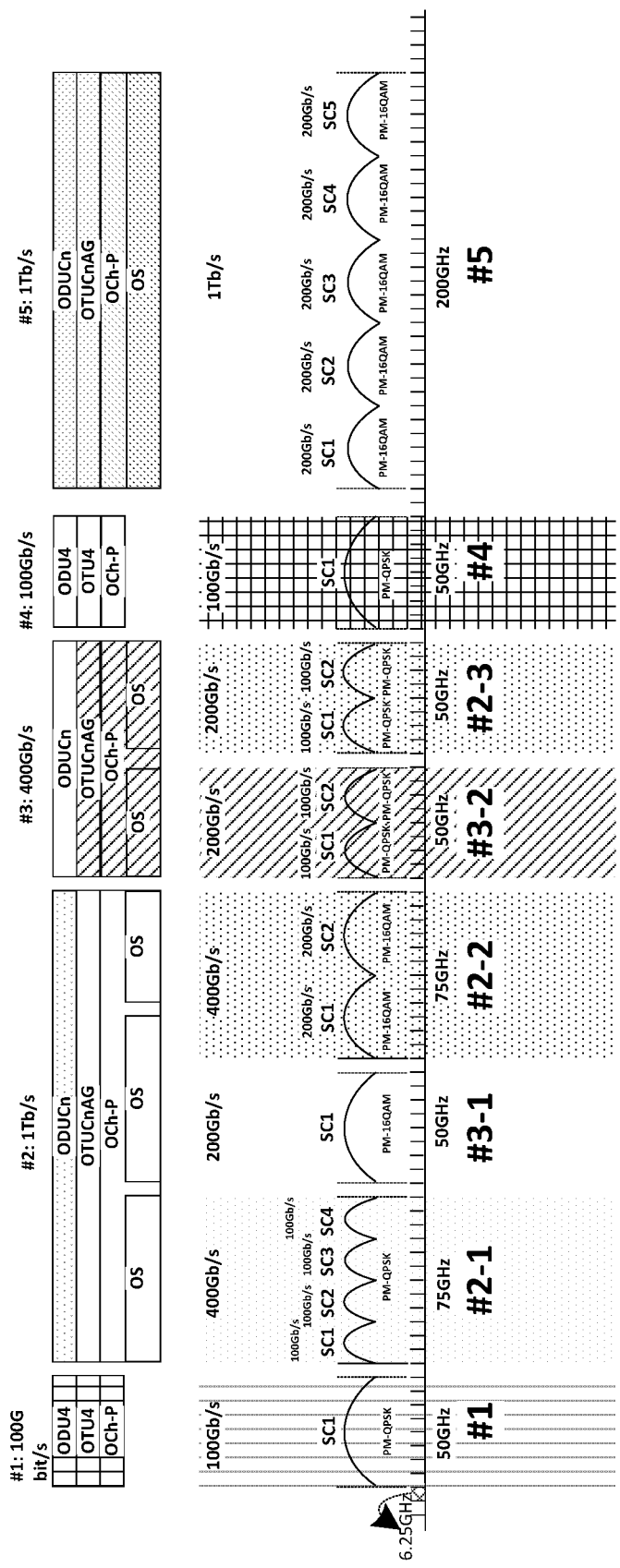
FIG. 9 is a diagram showing a processing flow that 5 signals are mapped, multiplexed and transmitted on the same optical fibre according to embodiment 2 of the disclosure.

The embodiment provides a management method for an OCh and an OMS. FIG. 9 is a diagram showing a processing flow that 5 signals are mapped, multiplexed and transmitted on the same optical fibre according to embodiment 2 of the disclosure. As shown in FIG. 9, there are totally 5 services transmitted on the same optical fibre, #1 and #4 are signals with 100 Gb/s, and each occupies 50 GHz frequency spectrum resources, and is transmitted through a single carrier in a Polarization-Multiplexed Quadrature Phase Shift Keying (PM-QPSK) modulation format.

2 is a 1 Tbit/s (i.e. 1 Tb/s) signal, an payload of the oCH signal is supported by three OSs, and each OS corresponds to a media channel, wherein bit rates of the media channels #2-1 and #2-2 corresponding to two OSs respectively are 400 Gb/s; four Sub Carriers (SCs) SC1, SC2, SC3 and SC4 adopting the PM-QPSK modulation format are adopted for transmission of media channel #2-1, a bit rate of each SC is 100 Gb/s, and totally 75 GHz frequency spectrum resources are occupied; two SCs SC1 and SC2 adopting a PM-16 QAM modulation format are adopted for transmission of media channel #2-2, a bit rate of each SC is 200 Gb/s, and totally 75 GHz frequency spectrum resources are occupied; and a bit rate of media channel #2-3 corresponding to the last OS is 200 Gb/s, two SCs SC1 and SC2 adopting the PM-QPSK modulation format are adopted for transmission of media channel #2-3, a bit rate of each SC is 100 Gb/s, and totally 50 GHz frequency spectrum resources are occupied.

3 is a 400 Gb/s signal, a payload of the OCh signal is supported by two OSs, each OS corresponds to a media channel, and bit rates of the media channels #3-1 and #3-2 corresponding to the two OSs are 200 Gb/s; and a single SC SC1 adopting the PM-16 QAM modulation format is adopted for transmission of media channel #3-1, and 50 GHz frequency spectrum resources are occupied. Two SCs SC1 and SC2 adopting the PM-QPSK modulation format are adopted for transmission of media channel #3-2, a bit rate of each SC is 100 Gb/s, and totally 50 GHz frequency spectrum resources are occupied.

5 is a 1 Tb/s signal, a payload of the OCh signal is supported by an OS, the OS corresponds to a media channel, five SCs SC1, SC2, SC3, SC4 and SC5 adopting the PM-16 QAM modulation format are adopted for transmitting the OCh signal, and the bit rate is 200 Gb/s, and 200 GHz frequency spectrum resources are occupied.

Table 1 describes overhead byte information to be inserted into OMS and OCh layers according to embodiment 2 of the disclosure, wherein a value of an NCF of an effective frequency slot of a media channel is represented by [NCF #X-Y], a value of a slot width of the effective frequency slot of the media channel is represented by Width #X-Y, X identifies a serial number of the OCh, Y identifies a serial number of the OS of the OCh or the media channel, and the OS and the media channel form a one-to-one corresponding relationship. A frequency spectrum range allocated to an SC in the media channel is represented by [NCF #X-Y-Z, Width #X-Y-Z], wherein Z represents a serial number of the SC. A frequency slice granularity may be 50 GHz or 100 GHz in a fixed grid and may be 6.25 GHz, 12.5 GHz, 25 GHz, 50 GHz or 100 GHz in a flexible grid. A multiplexing method for optical carriers may be Next-generation Wavelength Division Multiplexing (NWDM) or Orthogonal Frequency Division Multiplexing (OFDM); if NWDM is adopted, SCs are unrelated; and if OFDM is adopted, the SCs are related.

TABLE 1

| | | | | OCh-O (OCh Overhead) | | | | | |
|---|---|---|---|---|---|---|---|---|---|
| | | | | Question: Q11, IaDI | | | | | |
| | | | | Effective | To be confirmed by Q6, IaDI | | | OMS-O | |
| | | | | Frequency slot of the | Frequency Range | | | (OMS Overhead) Question 11 IaDI | |
| ODU | OTU | OCh-P | Network Media Channe | Network Media Channel [NCF #X-Y, Width #X-Y] | allocated to Sub Carriers [NCF #X-Y-Z, Width #X-Y-Z] | Modulation Format | Bit Rate | Effective frequency slot of the media channel | OCh identifier |
| ODU4 | OTU4 | OCh-P #1 | #1 | [NCF #1-1, Width #1-1] | Sub Carrier #1: [NCF #1-1-1, Width #1-1-1] | PM-QPSK | 100 Gbit/s | [NCF #1-1, Width #1-1] | #1 |
| ODUCn | OTUCnAG | OCh-P #2 | #2-1 | [NCF #2-1, Width #2-1] | Sub Carrier #1: [NCF #2-1-1, Width #2-1-1] | PM-QPSK | 100 Gbit/s | [NCF #2-1, Width #2-1] | #2 |
| | | | | | Sub Carrier #2: [NCF #2-1-2, Width #2-1-2] | PM-QPSK | 100 Gbit/s | | |
| | | | | | Sub Carrier #3: [NCF #2-1-3, Width | PM-QPSK | 100 Gbit/s | | |

TABLE 1-continued

| | | | | | OCh-O (OCh Overhead) | | | | |
| | | | | Question: Q11, IaDI | | | | | |
| | | | | Effective | To be confirmed by Q6, IaDI | | | OMS-O | |
| | | | | Frequency slot of the Network Media Channe | Frequency Range allocated to Sub Carriers [NCF #X-Y-Z, Width #X-Y-Z] | | | (OMS Overhead) Question 11 IaDI | |
| ODU | OTU | OCh-P | Network Media Channel [NCF #X-Y, Width #X-Y] | | | Modulation Format | Bit Rate | Effective frequency slot of the media channel | OCh identifier |
|---|---|---|---|---|---|---|---|---|---|
| | | | | | #2-1-3] Sub Carrier #4: [NCF #2-1-4, Width #2-1-4] | PM-QPSK | 100 Gbit/s | | |
| | | | #2-2 | [NCF #2-2, Width #2-2] | Sub Carrier #1: [NCF #2-2-1, Width #2-2-1] | PM-16QAM | 200 Gbit/s | [NCF #2-2, Width #2-2] | |
| | | | | | Sub Carrier #2: [NCF #2-2-2, Width #2-2-2] | PM-16QAM | 200 Gbit/s | | |
| | | | #2-3 | [NCF #2-3, Width #2-3] | Sub Carrier #1: [NCF #2-3-1, Width #2-3-1] | PM-QPSK | 100 Gbit/s | [NCF #2-3, Width #2-3] | |
| | | | | | Sub Carrier #2: [NCF #2-3-2, Width #2-3-2] | PM-QPSK | 100 Gbit/s | | |
| ODUCn | OTUCnAG | OCh-P #3 | #3-1 | [NCF #3-1, Width #3-1] | Sub Carrier #1: [NCF #3-1-1, Width #3-1-1] | PM-16QAM | 200 Gbit/s | [NCF #3-1, Width #3-1] | #3 |
| | | | #3-2 | [NCF #3-2, Width #3-2] | Sub Carrier #1: [NCF #3-2-1, Width #3-2-1] | PM-QPSK | 100 Gbit/s | [NCF #3-2, Width #3-2] | |
| | | | | | Sub Carrier #2: [NCF #3-2-2, Width #3-2-2] | PM-QPSK | 100 Gbit/s | | |
| ODU4 | OTU4 | OCh-P #4 | #4 | [NCF #4-1, Width #4-1] | Sub Carrier #1: [NCF #4-1-1, Width #4-1-1] | PM-QPSK | 100 Gbit/s | [NCF #4-1, Width #4-1] | #4 |
| ODUCn | OTUCnAG | OCh-P #5 | #5 | [NCF #5-1, Width #5-1] | Sub Carrier #1: [NCF #5-1-1, Width #5-1-1] | PM-16QAM | 200 Gbit/s | [NCF #5-1, Width #5-1] | #5 |
| | | | | | Sub Carrier #2: [NCF #5-1-2, Width #5-1-2] | PM-16QAM | 200 Gbit/s | | |
| | | | | | Sub Carrier #3: [NCF #5-1-3, Width #5-1-3] | PM-16QAM | 200 Gbit/s | | |
| | | | | | Sub Carrier #4: [NCF #5-1-4, Width #5-1-4] | PM-16QAM | 200 Gbit/s | | |
| | | | | | Sub Carrier #5: [NCF #5-1-5, | PM-16QAM | 200 Gbit/s | | |

TABLE 1-continued

| | | | | | OCh-O (OCh Overhead) | | | | |
|---|---|---|---|---|---|---|---|---|---|
| | | | | Question: Q11, IaDI | | | | | |
| | | | | Effective | To be confirmed by Q6, IaDI | | | OMS-O | |
| | | | | Frequency slot of the Network Media Channel [NCF #X-Y, Width #X-Y] | Frequency Range allocated to Sub Carriers [NCF #X-Y-Z, Width #X-Y-Z] | | | (OMS Overhead) Question 11 IaDI | |
| ODU | OTU | OCh-P | Network Media Channe | | | Modulation Format | Bit Rate | Effective frequency slot of the media channel | OCh identifier |
| | | | | | Width #5-1-5] | | | | |

In an implementation process, a processing flow of the management method for the OCh and the OMS in the embodiment includes the following blocks:

Block 1: an OS sending node inserts the following information into an OMS overhead layer:

an identifier value of OCh#1: #1, and values of an NCF and slot width of an effective frequency slot of a corresponding media channel: [NCF #1-1, Width #1-1];

an identifier value of OCh#2: #2, and values of NCFs and slot widths of effective frequency slots of three corresponding media channels: [NCF #2-1, Width #2-1], [NCF #2-2, Width #2-2] and [NCF #2-3, Width #2-3];

an identifier value of OCh#3: #3, and values of NCFs and slot widths of effective frequency slots of two corresponding media channels: [NCF #3-1, Width #3-1] and [NCF #3-2, Width #3-2];

an identifier value of OCh#4: #4, and values of an NCF and slot width of an effective frequency slot of a corresponding media channel: [NCF #4-1, Width #4-1]; and an identifier value of OCh#5: #5, and values of an NCF and slot width of an effective frequency slot of a corresponding media channel: [NCF #5-1, Width #5-1].

In block 2: the OS sending node inserts the following information into an OCh overhead layer:

the values of the NCF and slot width of the effective frequency slot of media channel #1 corresponding to OCh #1 are [NCF #1-1, Width #1-1], wherein one SC is adopted for transmission of the media channel, and the SC adopts a frequency spectrum range value of [NCF #1-1-1, Width #1-1-1], a rate level of 100Gb/s and a modulation format of PM-QPSK;

the values of the NCFs and slot widths of the effective frequency slots of the three media channels #2-1, #2-2 and #2-3 corresponding to OCh #2 are [NCF #2-1, Width #2-1], [NCF #2-2, Width #2-2] and [NCF #2-3, Width #2-3], wherein four SCs are adopted for transmission of media channel #2-1, frequency spectrum range values of the SCs are [NCF #2-1-1, Width #2-1-1], [NCF #2-1-2, Width #2-1-2], [NCF #2-1-3, Width #2-1-3] and [NCF #2-1-4, Width #2-1-4] respectively, bit rates of the four SCs are 100 Gb/s and modulation formats are PM-QPSK; two SCs are adopted for transmission of media channel #2-2, frequency spectrum range values of the SCs are [NCF #2-2-1, Width #2-2-1] and [NCF #2-2-2, Width #2-2-2] respectively, bit rates of the two SCs are 200 Gb/s and modulation formats are PM-16 QAM; two SCs are adopted for transmission of media channel #2-3, frequency spectrum range values of the SCs are [NCF #2-3-1, Width #2-3-1] and [NCF #2-3-2, Width #2-3-2] respectively, bit rates of the two SCs are 100 Gb/s and modulation formats are PM-QPSK;

the values of the NCFs and slot widths of the effective frequency slots of the two media channels #3-1 and #3-2 corresponding to OCh #3: [NCF #3-1, Width #3-1] and [NCF #3-2, Width #3-2], wherein one SC is adopted for transmission of media channel #3-1, and the SC adopts a frequency spectrum range value of [NCF #3-1-1, Width #3-1-1], a rate level of 200 Gb/s and a modulation format of PM-16 QAM; two SCs are adopted for transmission of media channel #3-2, frequency spectrum range values of the SCs are [NCF #3-2-1, Width #3-2-1] and [NCF #3-2-2, Width #3-2-2] respectively, bit rates of the two SCs are 100 Gb/s and modulation formats are PM-QPSK;

the values of the NCF and slot width of the effective frequency slot of the media channel corresponding to OCh #4 are [NCF #4-1, Width #4-1], wherein one SC is adopted for transmission of media channel #4-1, and the SC adopts a frequency spectrum range value of [NCF #4-1-1, Width #4-1-1], a rate level of 100 Gb/s and a modulation format of PM-QPSK; and the values of the NCF and slot width of the effective frequency slot of the media channel corresponding to OCh #5 are [NCF #5-1, Width #5-1] respectively, wherein four SCs are adopted for transmission of media channel #5-1, frequency spectrum range values of the SCs are [NCF #5-1-1, Width #5-1-1], [NCF #5-1-2, Width #5-1-2], [NCF #5-1-3, Width #5-1-3] and [NCF #5-1-4, Width #5-1-4] respectively, bit rates of the four SCs are 200 Gb/s and modulation formats are PM-16 QAM.

Block 3: when the OS passes through an intermediate node with a media channel matrix, the identifier of the OCh, the NCF and sloth width of the effective frequency slot of the media channel, and the frequency slice granularity are acquired from overhead information of the OMS layer, and the acquired information are compared with expected values, which are received from a management plane or a control plane by the node, of the identifier of the OCh and NCF and slot width of the effective frequency slot of the media channel, and if the expected values are different from the received values, an OMS layer mismatch alarm is generated; and if the received values are the same as the expected values, media channels #1, #2-1, #2-2, #2-3, #3-1, #3-2, #4 and #5 are filtered so as to demultiplex the media channel.

Block 4: then the node acquires the identifier of the OCh, the NCF and slot width of the effective frequency slot of the media channel, and information about the number of optical carriers in the media channel, a bit rate of each optical carrier, a modulation format of the each optical carrier, an NCF and slot width of the each optical carrier and a multiplexing method for the optical carriers from overhead information of an OCh layer, compares the acquired information with the expected identifier of the OCh, expected NCF and slot width of the effective frequency slot of the media channel and expected information about the number of the optical carriers in the media channel, the bit rate of the each optical carrier, the modulation format of the each optical carrier, the NCF and slot width of the each optical carrier and the multiplexing method for the optical carriers, which are configured by the management plane or the control plane, generates a mismatch alarm if the expected information is different from the acquired information, and switches the media channel to another optical fibre connected with the node according to frequency spectrum cross connection information (including switching a certain segment of frequency spectrum uniquely identified by an NCF and a slot width to another segment of frequency spectrum uniquely identified by an NCF and a slot width on another optical fibre) for configuration of media channels in the management plane or the control plane if the received values are the same as the expected values.

Block 5: if the node is a destination node of a service which is born by the OS, the node demodulates the OS according to the information about the number of the optical carriers in the media channel of the OCh layer, the bit rate of the each optical carrier, the modulation format of the each optical carrier, the NCF and slot width of the each optical carrier and the multiplexing method for the optical carriers.

Embodiment 3

Figure 10:
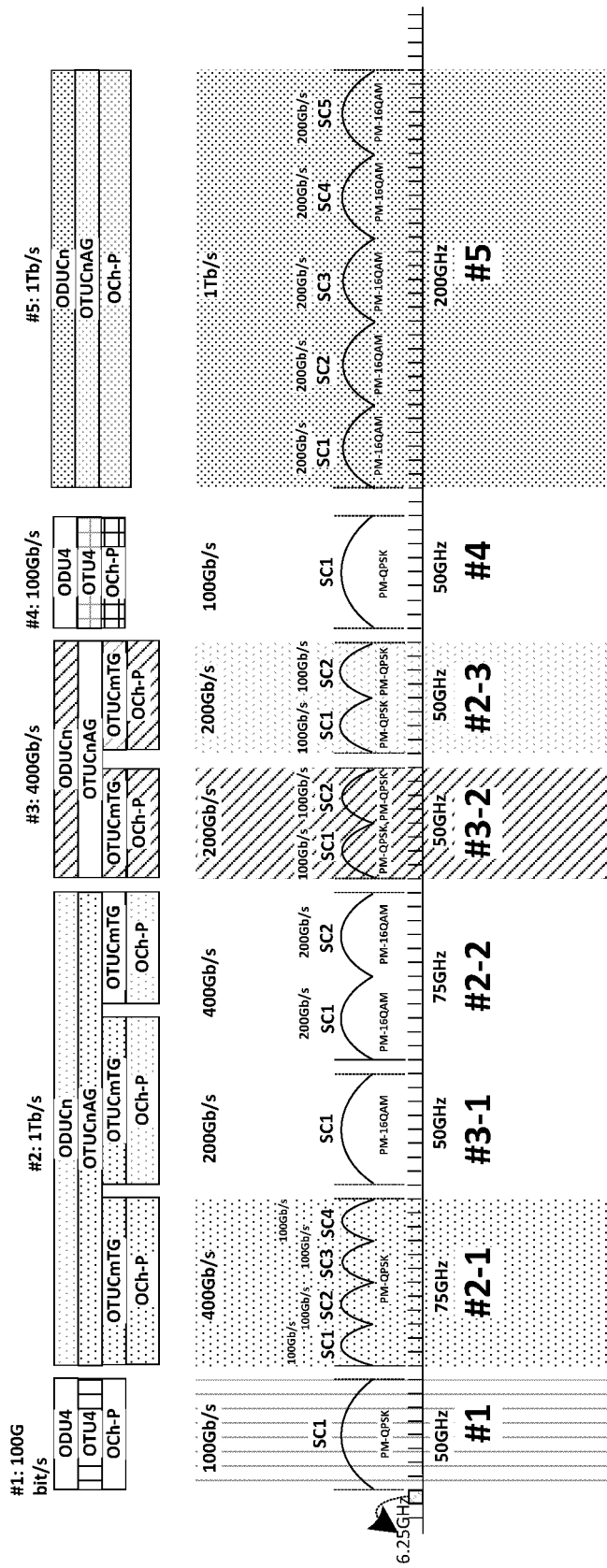
FIG. 10 is a diagram showing a processing flow that 5 signals are mapped, multiplexed and transmitted on the same optical fibre according to embodiment 3 of the disclosure.

The embodiment provides a management method for an OCh and an OMS. FIG. 10 is a diagram showing a processing flow that 5 signals are mapped, multiplexed and OS transmitted on the same optical fibre according to embodiment 3 of the disclosure. As shown in FIG. 10, there are totally 5 services transmitted on the same optical fibre, #1 and #4 are 100 Gb/s signals, and each occupies 50 GHz frequency spectrum resources, and is transmitted through a single carrier in a PM-QPSK modulation format.

2 is a 1 Tb/s signal, OTUCnAG is supported by three OCh-Ps, and each OCh-P corresponds to a media channel, wherein bit rates of media channels #2-1 and #2-2 corresponding to two OCh-Ps are 400 Gb/s; four SCs SC1, SC2, SC3 and SC4 adopting the PM-QPSK modulation format are adopted for transmission of media channel #2-1, a bit rate of each SC is 100 Gb/s, and totally 75 GHz frequency spectrum resources are occupied; two SCs SC1 and SC2 adopting a PM-16 QAM modulation format are adopted for transmission of media channel #2-2, a bit rate of each SC is 200 Gb/s, and totally 75 GHz frequency spectrum resources are occupied; and a bit rate of media channel #2-3 corresponding to the last OCh-P is 200 Gb/s, two SCs SC1 and SC2 adopting the PM-QPSK modulation format are adopted for transmission of media channel #2-3, a bit rate of each SC is 100 Gb/s, and totally 50 GHz frequency spectrum resources are occupied.

3 is a 400 Gb/s signal, a payload of the OTUCnAG signal is supported by two OCh-Ps, each OCh-P corresponds to a media channel, and bit rates of media channels #3-1 and #3-2 corresponding to the two OCh-Ps are 200 Gb/s; and a single SC SC1 adopting the PM-16 QAM modulation format is adopted for transmission of media channel #3-1, and 50 GHz frequency spectrum resources are occupied. Two SCs SC1 and SC2 adopting the PM-QPSK modulation format are adopted for transmission of media channel #3-2, a bit rate of each SC is 100 Gb/s, and totally 50 GHz frequency spectrum resources are occupied.

5 is a 1 Tb/s signal, a payload of the OTUCnAG signal is supported by an OCh-P, the OCh-P corresponds to a media channel, five SCs SC1, SC2, SC3, SC4 and SC5 adopting the PM-16 QAM modulation format are adopted for transmission, and each SC has a bit rate of 200 Gb/s, and 200 GHz frequency spectrum resources are occupied.

Table 2 describes overhead byte information to be inserted into OMS and OCh layers according to embodiment 3 of the disclosure, wherein a value of an NCF of an effective frequency slot of a media channel is represented by [NCF #X-Y], a value of a slot width of the effective frequency slot of the media channel is represented by Width #X-Y, X identifies a serial number of the OCh, Y identifies a serial number of the OCh-P of the OCh or the media channel, and the OCh-P and the media channel form a one-to-one corresponding relationship. A frequency spectrum range allocated to an SC in the media channel is represented by [NCF #X-Y-Z, Width #X-Y-Z], wherein Z represents a serial number of the SC. A frequency slice granularity may be 50 GHz or 100 GHz in a fixed grid and maybe 6.25 GHz, 12.5 GHz, 25 GHz, 50 GHz or 100 GHz in a flexible grid. A multiplexing method for optical carriers may be NWDM or OFDM; if NWDM is adopted, SCs are unrelated; and if OFDM is adopted, the SCs are related.

TABLE 2

| | | | | OCh-O (OCh Overhead) | | | | | |
| | | | | Question: Q11, IaDI | | | | | |
| | | | | | Effective frequency slot of the Network Media Channel [NCF #X-Y-Z, Width #X-Y-Z] | To be confirmed by Q6, IaDI | | | |
| | | | | | | Frequency Range of Sub Carrier [NCF #X-Y-Z, Width #X-Y-Z] | | | OMS-O (OMS Overhead) Question 11 IaDI |
| ODU | OTU | OTU | OCh | Network Media Channel | | | Module Format | Bit Rate | Effective Frequency Slot of the media channel | OTS identifier |
| ODU4 | OTU4 | | OCh-P #1 | #1 | [NCF #1-1, Width #1-1] | Sub Carrier #1: [NCF | PM-QPSK | 100 Gbit/s | [NCF #1-1, Width #1-1] | #1 |

TABLE 2-continued

| | | | | | OCh-O (OCh Overhead) | | | | | |
|---|---|---|---|---|---|---|---|---|---|---|
| | | | | | Question: Q11, IaDI | | | | | |
| | | | | | Effective frequency slot of the Network Media Channel [NCF #X-Y-Z, Width #X-Y-Z] | To be confirmed by Q6, IaDI | | | OMS-O (OMS Overhead) Question 11 IaDI | |
| | | | | | | Frequency Range of Sub Carrier [NCF #X-Y-Z, Width #X-Y-Z] | | | Effective Frequency Slot of the media channel | |
| ODU | OTU | OTU | OCh | Network Media Channel | | | Module Format | Bit Rate | | OTS identifier |
| ODUCn | OTUCnAG | OTUCmTG #2-1 | OCh-P #2-1 | #2-1 | [NCF #2-1, Width #2-1] | Sub Carrier #1: [NCF #2-1-1, Width #2-1-1] | PM-QPSK | 100 Gbit/s | [NCF #2-1, Width #2-1] | #2-1 |
| | | | | | | Sub Carrier #2: [NCF #2-1-2, Width #2-1-2] | PM-QPSK | 100 Gbit/s | | |
| | | | | | | Sub Carrier #3: [NCF #2-1-3, Width #2-1-3] | PM-QPSK | 100 Gbit/s | | |
| | | | | | | Sub Carrier #4: [NCF #2-1-4, Width #2-1-4] | PM-QPSK | 100 Gbit/s | | |
| | | OTUCmTG #2-2 | OCh-P #2-2 | #2-2 | [NCF #2-2, Width #2-2] | Sub Carrier #1: [NCF #2-2-1, Width #2-2-1] | PM-16QAM | 200 Gbit/s | [NCF #2-2, Width #2-2] | #2-2 |
| | | | | | | Sub Carrier #2: [NCF #2-2-2, Width #2-2-2] | PM-16QAM | 200 Gbit/s | | |
| | | OTUCmTG #2-3 | OCh-P #2-3 | #2-3 | [NCF #2-3, Width #2-3] | Sub Carrier #1: [NCF #2-3-1, Width #2-3-1] | PM-QPSK | 100 Gbit/s | [NCF #2-1, Width #2-1] | #2-3 |
| | | | | | | Sub Carrier #2: [NCF #2-3-2, Width #2-3-2] | PM-QPSK | 100 Gbit/s | | |
| ODUCn | OTUCnAG | OTUCmTG #3-1 | OCh-P #3-1 | #3-1 | [NCF #3-1, Width #3-1] | Sub Carrier #1: [NCF #3-1-1, Width #3-1-1] | PM-16QAM | 200 Gbit/s | [NCF #3-1, Width #3-1] | #3-1 |
| | | OTUCmTG #3-2 | OCh-P #3-2 | #3-2 | [NCF #3-2, Width #3-2] | Sub Carrier #1: [NCF #3-2-1, Width #3-2-1] | PM-QPSK | 100 Gbit/s | [NCF #3-2, Width #3-2] | #3-2 |

TABLE 2-continued

| | | | | | OCh-O (OCh Overhead) | | | | | |
| | | | | | Question: Q11, IaDI | | | | | |
| | | | | | | | To be confirmed by Q6, IaDI | | OMS-O (OMS Overhead) Question 11 IaDI | |
| | | | | | Effective frequency slot of the Network Media | Frequency Range of Sub | | | | |
| ODU | OTU | OTU | OCh | Network Media Channel | Channel [NCF #X-Y-Z, Width #X-Y-Z] | Carrier [NCF #X-Y-Z, Width #X-Y-Z] | Module Format | Bit Rate | Effective Frequency Slot of the media channel | OTS identifier |
|---|---|---|---|---|---|---|---|---|---|---|
| | | | | | | Sub Carrier #2: [NCF #3-2-2, Width #3-2-2] | PM-QPSK | 100 Gbit/s | | |
| ODU4 | OTU4 | | OCh-P #4 | #4 | [NCF #4-1, Width #4-1] | Sub Carrier #1: [NCF #4-1-1, Width #4-1-1] | PM-QPSK | 100 Gbit/s | [NCF #4-1, Width #4-1] | #4 |
| ODUCn | OTUCnAG | OTUCmTG #5 | OCh-P #5 | #5 | [NCF #5-1, Width #5-1] | Sub Carrier #1: [NCF #5-1-1, Width #5-1-1] | PM-16QAM | 200 Gbit/s | [NCF #5-1, Width #5-1] | #5 |
| | | | | | | Sub Carrier #2: [NCF #5-1-2, Width #5-1-2] | PM-16QAM | 200 Gbit/s | | |
| | | | | | | Sub Carrier #3: [NCF #5-1-3, Width #5-1-3] | PM-16QAM | 200 Gbit/s | | |
| | | | | | | Sub Carrier #2: [NCF #5-1-4, Width #5-1-4] | PM-16QAM | 200 Gbit/s | | |
| | | | | | | Sub Carrier #3: [NCF #5-1-5, Width #5-1-5] | PM-16QAM | 200 Gbit/s | | |

In an implementation process, a processing flow of the management method for the OCh and the OMS in the embodiment includes the following blocks.

In block 1: an OS sending node inserts the following information into an OMS overhead layer:

an identifier value of OCh#1: #1, and values of an NCF and slot width of an effective frequency slot of a corresponding media channel are [NCF #1-1, Width #1-1];

an identifier value of OCh#2-1: #2-1, and values of an NCF and slot width of an effective frequency slot of a corresponding media channel are [NCF #2-1, Width #2-1];

an identifier value of OCh#2-2: #2-2, and values of an NCF and slot width of an effective frequency slot of a corresponding media channel are [NCF #2-2, Width #2-2];

an identifier value of OCh#2-3: #2-3, and values of an NCF and slot width of an effective frequency slot of a corresponding media channel are [NCF #2-3, Width #2-3];

an identifier value of OCh#3-1: #3-1, and values of an NCF and slot width of an effective frequency slot of a corresponding media channel are [NCF #3-1, Width #3-1];

an identifier value of OCh#3-2: #3-2, and values of an NCF and slot width of an effective frequency slot of a corresponding media channel are [NCF #3-2, Width #3-2];

an identifier value of OCh#4: #4, and values of an NCF and slot width of an effective frequency slot of a corresponding media channel are [NCF #4-1, Width #4-1]; and an identifier value of OCh#5: #5, and values of an NCF and slot width of an effective frequency slot of a corresponding media channel are [NCF #5-1, Width #5-1].

In block 2: the OS sending node inserts the following information into an OCh overhead layer:

the values of the NCF and slot width of the effective frequency slot of media channel #1 corresponding to OCh #1 are [NCF #1-1, Width #1-1], wherein one SC is adopted for transmission of the media channel, and the SC adopts a frequency spectrum range value of [NCF #1-1-1, Width #1-1-1], a rate level of 100Gb/s and a modulation format of PM-QPSK;

the values of the NCF and slot width of the effective frequency slot of media channel #2-1 corresponding to OCh #2-1 are [NCF #2-1, Width #2-1], wherein four SCs are adopted for transmission of media channel #2-1, frequency spectrum range values of the SCs are [NCF #2-1-1, Width #2-1-1], [NCF #2-1-2, Width #2-1-2], [NCF #2-1-3, Width #2-1-3] and [NCF #2-1-4, Width #2-1-4] respectively, bit rates of the four SCs are 100 Gb/s and modulation formats are PM-QPSK;

the values of the NCF and slot width of the effective frequency slot of media channel #2-2 corresponding to OCh #2-2 are [NCF #2-2, Width #2-2], wherein two SCs are adopted for transmission of media channel #2-2, frequency spectrum range values of the SCs are [NCF #2-2-1, Width #2-2-1] and [NCF #2-2-2, Width #2-2-2] respectively, bit rates of the two SCs are 200 Gb/s and modulation formats are PM-16 QAM;

the values of the NCF and slot width of the effective frequency slot of media channel #2-3 corresponding to OCh #2-3 are [NCF #2-3, Width #2-3], wherein two SCs are adopted for transmission of media channel #2-3, frequency spectrum range values of the SCs are [NCF #2-3-1, Width #2-3-1] and [NCF #2-3-2, Width #2-3-2] respectively, bit rates of the two SCs are 100 Gb/s and modulation formats are PM-QPSK;

the values of the NCF and slot width of the effective frequency slot of media channels #3-1 corresponding to OCh #3-1: [NCF #3-1, Width #3-1], wherein one SC is adopted for transmission of media channel #3-1, and the SC adopts a frequency spectrum range value of [NCF #3-1-1, Width #3-1-1], a rate level of 200 Gb/s and a modulation format of PM-16 QAM;

the values of the NCF and slot width of the effective frequency slot of media channels #3-2 corresponding to OCh #3-2: [NCF #3-2, Width #3-2], wherein two SCs are adopted for transmission of media channel #3-2, frequency spectrum range values of the SCs are [NCF #3-2-1, Width #3-2-1] and [NCF #3-2-2, Width #3-2-2] respectively, bit rates of the two SCs are 100 Gb/s and modulation formats are PM-QPSK;

the values of the NCF and slot width of the effective frequency slot of the media channel corresponding to OCh #4 are [NCF #4-1, Width #4-1], wherein one SC is adopted for transmission of media channel #4-1, and the SC adopts a frequency spectrum range value of [NCF #4-1-1, Width #4-1-1], a rate level of 100 Gb/s and a modulation format of PM-QPSK; and the values of the NCF and slot width of the effective frequency slot of the media channel corresponding to OCh #5 are [NCF #5-1, Width #5-1], wherein four SCs are adopted for transmission of media channel #5-1, frequency spectrum range values of the SCs are [NCF #5-1-1, Width #5-1-1], [NCF #5-1-2, Width #5-1-2], [NCF #5-1-3, Width #5-1-3] and [NCF #5-1-4, Width #5-1-4] respectively, bit rates of the four SCs are 200 Gb/s and modulation formats are PM-16 QAM.

In block 3: when the OS passes through an intermediate node with a media channel matrix, the identifier of the OCh, the NCF and sloth width of the effective frequency slot of the media channel and the frequency slice granularity are acquired from overhead information of the OMS layer, and are compared with expected values, which are received from a management plane or a control plane by the node, of the identifier of the OCh and NCF and slot width of the effective frequency slot of the media channel, and if the received values are different from the received values, an OMS layer mismatch alarm is generated; and if the received values are the same as the expected values, media channels #1, #2-1, #2-2, #2-3, #3-1, #3-2, #4 and #5 are filtered to demultiplex the media channel.

In block 4: then the node acquires the identifier of the OCh, the NCF and slot width of the effective frequency slot of the media channel and information about the number of optical carriers in the media channel, a bit rate of the each optical carrier, a modulation format of the each optical carrier, an NCF and slot width of the optical carrier and a multiplexing method for the optical carriers from overhead information of an OCh layer, compares the acquired overhead information with the expected identifier of the OCh, expected NCF and slot width of the effective frequency slot of the media channel and expected information about the number of the optical carriers in the media channel, the bit rate of the each optical carrier, the modulation format of the each optical carrier, the NCF and slot width of the optical carriers and the multiplexing method for the optical carriers, which are configured by the management plane or the control plane, generates a mismatch alarm if the configured information is different from the received information, and switches the media channel to another optical fibre connected with the node according to frequency spectrum cross connection information (including switching a certain segment of frequency spectrum uniquely identified by an NCF and a slot width to another segment of frequency spectrum uniquely identified by an NCF and a slot width on another optical fibre) for configuration of media channels in the management plane or the control plane if the received values are the same as the expected values.

In block 5: if the node is a destination node of a service which is born by the OS, the node demodulates the OS according to the information about the number of the optical carriers in the media channel of the OCh layer, the bit rate of the carriers, the modulation format of the carriers, the NCF and slot width of the carriers and the multiplexing method for the optical carriers.

From the above, the embodiment of the disclosure provides the method for processing an OS and the corresponding optical node. The OS sending node inserts new channel information into the OMS overhead of the OS, and/or, the OS sending node inserts the new OCh information and new optical carrier information into the overhead of the OCh of the OS, so that the problem of how to effectively implement frequency spectrum planning and management after the introduction of the flexible grid technology in the related technology is solved, and processing efficiency and accuracy of a system are improved.

Obviously, those skilled in the art should know that each component or block of the disclosure may be implemented by a universal computing device, and the components or blocks may be concentrated on a single computing device or distributed on a network formed by multiple computing devices, and may optionally be implemented by programmable codes executable for the computing devices, so that the components or blocks may be stored in a storage device for execution with the computing devices, or may form each integrated circuit component, or multiple components or blocks therein may form a single integrated circuit component for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

What is claimed is:

1. A method for processing an Optical Signal (OS), comprising:
   inserting, by an OS sending node, Optical Channel (OCh) information into an Optical Multiplex Section (OMS) overhead of the OS; and
   inserting, by the OS sending node, the OCh information and optical carrier information into an OCh overhead of the OS;
   wherein the OCh information comprises an identifier of the OCh, a Nominal Central Frequency (NCF) of an effective frequency slot of a media channel and a slot width of the effective frequency slot of the media channel, a frequency slice granularity, wherein the optical carrier information comprises: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers;
   wherein when an OCh payload is supported by multiple media channels, the OCh information comprises the identifier of the OCh, an NCF of an effective frequency slot of each media channel supporting the OCh payload and slot widths of the effective frequency slots of all the media channels supporting the OCh payload, and a frequency slice granularity.

2. The method according to claim 1, wherein when different optical carriers in the media channel adopt different modulation formats and different bit rates, the optical carrier information comprises: a bit rate of each optical carrier in the media channel, a modulation format of each optical carrier in the media channel, an NCF of each optical carrier in the media channel and a slot width of each optical carrier in the media channel, and the multiplexing method for the optical carriers.

3. The method according to claim 2, wherein after the OS sending node inserts the OCh information and the optical carrier information into the overhead of the OCh of the OS, the method further comprises:
   acquiring, by an intermediate optical node with a media channel matrix, the OCh information and the optical carrier information from the overhead of the OCh of the OS;
   comparing, by the intermediate optical node, the acquired OCh information and optical carrier information with the expected OCh information and expected optical carrier information received from a local management plane or control plane respectively; and
   based on that the acquired OCh information and optical carrier information are the same as the expected OCh information and the expected optical carrier information, switching, by the intermediate optical node, a demultiplexed media channel to another optical fibre connected with the optical node according to frequency spectrum cross connection information for configuration of media channels in the local management plane or control plane, and based on that the acquired OCh information and optical carrier information are different from the expected OCh information and the expected optical carrier information prompting, by the intermediate optical node, an alarm about a configuration error of the OCh of the OS.

4. The method according to claim 1, wherein after the OS sending node inserts the OCh information into the OMS overhead of the OS, the method further comprises:
   receiving, by an intermediate optical node with a media channel matrix, the OS from the sending node;
   comparing, by the intermediate optical node, the OCh information acquired from the OMS overhead of the OS with expected OCh information received from a local management plane or control plane; and
   based on that the acquired OCh information is the same as the expected OCh information, demultiplexing, by the intermediate optical node, the media channel corresponding to the OCh from the OS according to the acquired OCh information, and based on that the acquired OCh information is different from the expected OCh information, prompting, by the intermediate optical node, an alarm about a configuration error of the OMS of the OS.

5. The method according to claim 4, wherein before the intermediate optical node receives the OS from the sending node, the method further comprises:
   directly transmitting, by the management plane or the control plane, the expected OCh information to the intermediate optical node.

6. The method according to claim 1, wherein after the OS sending node inserts the OCh information and the optical carrier information into the overhead of the OCh of the OS, the method further comprises:
   acquiring, by an intermediate optical node with a media channel matrix, the OCh information and the optical carrier information from the overhead of the OCh of the OS;
   comparing, by the intermediate optical node, the acquired OCh information and optical carrier information with the expected OCh information and expected optical carrier information received from a local management plane or control plane respectively; and
   based on that the acquired OCh information and optical carrier information are the same as the expected OCh information and the expected optical carrier information, switching, by the intermediate optical node, a demultiplexed media channel to another optical fibre connected with the optical node according to frequency spectrum cross connection information for configuration of media channels in the local management plane or control plane, and based on that the acquired OCh information and optical carrier information are different from the expected OCh information and the expected optical carrier information prompting, by the intermediate optical node, an alarm about a configuration error of the OCh of the OS.

7. The method according to claim 6, wherein before the intermediate optical node receives the OS from the sending node, the method further comprises:
   directly transmitting, by the management plane or the control plane, the expected OCh information and the expected optical carrier information to the intermediate optical node.

8. The method according to claim 1, wherein after the OS sending node inserts the OCh information and the optical carrier information into the overhead of the OCh of the OS, the method further comprises:

when a destination node of a service born by the OS receives the OS, acquiring, by the destination node, the OCh information and the optical carrier information from the overhead of the OCh of the OS, and demodulating the OS according to the acquired OCh information and optical carrier information.

9. An Optical Signal (OS) sending node, comprising a hardware processor, configured to perform programming components stored in a memory, wherein the programming components comprise:

an insertion component configured to insert Optical Channel (OCh) information into an Optical Multiplex Section (OMS) overhead of an OS to be sent, and configured to insert the OCh information and optical carrier information into an OCh overhead of the OS;

wherein the OCh information comprises an identifier of the OCh, a Nominal Central Frequency (NCF) of an effective frequency slot of a media channel and a slot width of the effective frequency slot of the media channel, and a frequency slice granularity, wherein the optical carrier information comprises: the number of optical carriers in the media channel, bit rates of the optical carriers in the media channel, modulation formats of the optical carriers in the media channel, NCFs of the optical carriers in the media channel, slot widths of the optical carriers in the media channel, and a multiplexing method for the optical carriers;

wherein when an OCh payload is supported by multiple media channels, the OCh information comprises the identifier of the OCh, an NCF of an effective frequency slot of each media channel supporting the OCh payload and slot widths of the effective frequency slots of all the media channels supporting the OCh payload, and a frequency slice granularity.

10. An optical node with a media channel matrix, comprising a hardware processor, configured to perform programming components stored in a memory, wherein the programming components comprise:

a receiving component configured to receive an Optical Signal (OS) which bears service data from an upstream node;

a comparing component configured to compare Optical Channel (OCh) information acquired from an Optical Multiplex Section (OMS) overhead of the OS with expected OCh information received from a local management plane or control plane, wherein the OCh information comprises an identifier of an OCh, a Nominal Central Frequency (NCF) of an effective frequency slot of a media channel and a slot width of the effective frequency slot of the media channel, and a frequency slice granularity; and an OMS processing component configured to, under the condition that the acquired OCh information is the same as the expected OCh information, demultiplex the media channel corresponding to the OCh from the OS according to the acquired OCh information, and under the condition that the acquired OCh information is different from the expected OCh information, prompt an alarm about a configuration error of the OMS of the OS;

wherein when an OCh payload is supported by multiple media channels, the OCh information comprises the identifier of the OCh, an NCF of an effective frequency slot of each media channel supporting the OCh payload and slot widths of the effective frequency slots of all the media channels supporting the OCh payload, and a frequency slice granularity.

11. An optical node with a media channel matrix, comprising a hardware processor, configured to perform programming components stored in a memory, wherein the programming components comprise:

an acquiring component configured to acquire OCh information and optical carrier information from an overhead of an Optical Channel (OCh) of a received Optical Signal (OS), wherein the OCh information comprises an identifier of the OCh, a Nominal Central Frequency (NCF) of an effective frequency slot of a media channel and a slot width of the effective frequency slot of the media channel, and a frequency slice granularity, and the optical carrier information comprises: the number of optical carriers in the media channel, bit rates of the optical carriers in the media channel, modulation formats of the optical carriers in the media channel, NCFs of the optical carriers in the media channel, slot widths of the optical carriers in the media channel and a multiplexing method for the optical carriers;

a judgment component configured to compare the acquired OCh information and optical carrier information with expected OCh information and expected optical carrier information received from a local management plane or control plane; and an OCh processing component configured to, under the condition that the acquired OCh information and optical carrier information are the same as the expected OCh information and the expected optical carrier information, switch a demultiplexed media channel to another optical fibre connected with the optical node according to frequency spectrum cross connection information for configuration of media channels in the local management plane or control plane, and under the condition that the acquired OCh information and optical carrier information are different from the expected OCh information and the expected optical carrier information, prompt an alarm about a configuration error of the OCh of the OS;

wherein when an OCh payload is supported by multiple media channels, the OCh information comprises the identifier of the OCh, an NCF of an effective frequency slot of each media channel supporting the OCh payload and slot widths of the effective frequency slots of all the media channels supporting the OCh payload, and a frequency slice granularity.

12. The optical node according to claim 11, further comprising:

a demodulation component configured to demodulate the OS according to the OCh information and optical carrier information acquired from the overhead of the OCh by the acquiring component.

* * * * *